United States Patent [19]
Kuipers et al.

[11] Patent Number: 5,610,669
[45] Date of Patent: Mar. 11, 1997

[54] TEMPLE FOR EYEGLASSES EMBODYING AN INTEGRALLY FORMED EAR PIECE

[76] Inventors: Raymond J. Kuipers; Dominica R. Kuipers, both of 27312 Via Segundo, Mission Viejo, Calif. 92692

[21] Appl. No.: 499,860

[22] Filed: Jul. 10, 1995

[51] Int. Cl.$^6$ ................................................. G02C 5/14
[52] U.S. Cl. ........................................................ 351/122
[58] Field of Search ................................. 351/111, 123, 351/122

[56] References Cited

U.S. PATENT DOCUMENTS

| | | | |
|---|---|---|---|
| 4,674,851 | 6/1987 | Jannard | 351/47 |
| 4,730,915 | 3/1988 | Jannard | 351/47 |
| 4,741,611 | 5/1988 | Burns | 351/44 |
| 5,007,726 | 4/1991 | Suzuki et al. | 351/122 |
| 5,054,903 | 10/1991 | Jannard et al. | 351/123 |
| 5,249,001 | 9/1993 | Jannard | 351/123 |

FOREIGN PATENT DOCUMENTS wo/9107685  5/1991  WIPO ................................. 351/123

*Primary Examiner*—Huy Mai
*Attorney, Agent, or Firm*—Jeffrey P. Aiello; Leary, Titus & Aiello

[57] ABSTRACT

An improved eyeglass temple for retaining eyeglasses on the head of a wearer is provided. The temple includes an engaging portion that extends from a second end of the temple to a support section. An ear stem extends through the engaging portion and has a cross-sectional dimension less than the cross-sectional dimension of the support section, adjacent to the engaging portion. A resilient, elastomeric ear piece is integrally formed on the ear stem to form the engaging portion. The elastomeric ear piece provides an increased coefficient of friction between the engaging portion and the head and ear of the wearer, to prevent inadvertent relative movement between the temple and the wearer. The elastomeric ear piece is formed on the ear stem at such a temperature that the molecular structure of the elastomeric material comprising the ear piece cross-links to the molecular structure of the material comprising the temple, preferably a hard plastic, to integrally bond the ear piece to the ear stem. Thus, the ear piece of the invented temple does not detach from the ear stem, nor does it move about thereon. Further, the ear piece is sufficiently deflectable to inhibit the ear piece from exerting excessive pressure on the head and ear of the wearer, for increasing the comfort of the wearer, while securely retaining the temple on the wearer's head.

16 Claims, 1 Drawing Sheet

TEMPLE FOR EYEGLASSES EMBODYING AN INTEGRALLY FORMED EAR PIECE

BACKGROUND OF THE INVENTION

1. Field of the Invention

The present invention relates generally to eyewear, and more particularly, to an improved temple for eyeglasses embodying an integrally formed, elastomeric ear piece.

2. Description of Related Art

Eyeglasses, embodying corrective eyeglasses or sunglasses are well known in the art. While the lenses in sunglasses or corrective lenses may be crafted for a specific individual, the frames most often are not. Eyeglass frames, including the temple, are usually constructed to conform to an idealized standard adult head. However, the frames rarely precisely fit the wearer's head, due to the almost limitless number of different shapes and sizes of the head of each individual wearer.

Thus, the fit of the frame on the wearer's head is typically too tight or too loose about the head. A frame that is too loose, usually results in the frame moving freely about on the head and possibly falling off of the wearer. A tight fitting frame may cause the wearer pain which could result in headaches and irritations, for example.

To aid with securing the eyeglasses to the user's head, temples have long been designed with an arcuate portion at the distal end of the temple, commonly referred to as the ear piece. The ear piece extends behind the ear, for engaging the back of the wearer's ear. The ear piece may be covered with a thin layer of hard plastic, if the ear piece is fabricated from metal for example. However, since there are significant variations among individuals in the distance from the position of the eyeglass lens and the back of the ear, the length of the temple is often too long or too short.

This results in the ear piece not properly engaging the wearer's ear. Thus, the ear piece may irritate the ear, due to friction for example, if the temple is too short, or the eyeglasses may fall off of the wearer's head if the temple is too long and the ear piece does not sufficiently engage the back of the wearer's ear. This is particularly disadvantageous during sports activities such as running and cycling, for example. As the wearer perspires, moisture and body oil cover the hard plastic ear piece. When the ear piece is covered with oil and moisture, the coefficient of friction between the wearer and ear piece is reduced, and the eyeglasses easily fall off the wearer.

A prior art attempt to improve the retention of eyewear about a wearer's head is disclosed in U.S. Pat. No. 5,054,903, to Jannard et al. The patent to Jannard et al., discloses an eyewear traction device that comprises a cylindrical, elastomeric traction member that is disposed in a recessed seat of a temple. The traction member provides a contact area between the temple and the head, for retaining the eyewear on the wearer's head. A disadvantage of the disclosed traction member is that it is not affixed to the temple. Over time, the traction member may be dislodged from the temple, and become lost, for example. Further, as the traction member is not affixed to the temple, the traction member may move freely about in the recessed seat, and possibly longitudinally along the temple, which would be undesirable.

U.S. Pat. No. 5,249,001, to Jannard, discloses an earstem for eyeglasses that provides retention. The disclosed earstem includes a diverging section, a transition section, a converging section, and a retaining section. The retaining section extends posteriorally from the converging section so as to provide an interfacing surface between the eyewear and the head. The retaining section accommodates a traction device, as disclosed in U.S. Pat. No. 5,054,903, to Jannard et al., to enhance the retention of the eyewear about the head, by increasing the coefficient of static friction between the eyewear and the head. A disadvantage of the disclosed earstem, as discussed above, is that the traction member may be dislodged from the temple, and become lost, or may move freely about the recessed seat and temple.

Alternative embodiment of eyeglasses are disclosed in U.S. Pat. No. 4,730,915, to Jannard; U.S. Pat. No. 4,741,611, to Burns; and U.S. Pat. No. 4,674,851, to Jannard.

There therefore exists a need for an improved temple for eyeglasses that includes a resilient ear piece that will not detach from the temple or move about on the temple, and further enhances retaining of the eyeglasses on the wearer.

OBJECTS OF THE INVENTION

It is therefore an object of the present invention to provide an improved temple for retaining eyeglasses on the head of a wearer that includes an integrally formed elastomeric ear piece;

It is a further object of the present invention to provide an improved temple for retaining eyeglasses on the head of a wearer that includes an integrally formed elastomeric ear piece which provides an increased coefficient of friction between the ear piece and the head and ear of the wearer;

It is still another object of the present invention to provide an improved temple that includes an elastomeric ear piece which does not detach from the temple;

It is yet a further object of the present invention to provide an improved temple that includes an elastomeric ear piece which does not move about on the temple; and It is another object of the present invention to provide an improved temple that includes an integrally formed elastomeric ear piece which is sufficiently deflectable to inhibit the ear piece from exerting excessive pressure on the head and ear of the wearer, to provide substantial comfort to the wearer.

SUMMARY OF THE INVENTION

These and other objects and advantages of the present invention are achieved by providing an improved eyeglass temple for retaining eyeglasses on the head of a wearer that embodies an integrally formed elastomeric ear piece. The temple preferably comprises plastic, and includes a support section and an engaging portion. The support section is provided for coupling the temple to a frame of the eyeglasses. The engaging portion extends from a second end of the temple to the support section. The engaging portion includes an ear stem integrally formed with the support section. The ear stem has a cross-sectional dimension less than the cross-sectional dimension of the support section.

The resilient, elastomeric ear piece is integrally formed on the ear stem. The elastomeric ear piece provides an increased coefficient of friction between the ear stem and the head and ear of the wearer to prevent inadvertent relative movement between the temple and the wearer. Thus, the ear piece of the temple of the present invention substantially aids with retaining the eyeglasses on the wearer.

The elastomeric ear piece is formed on the ear stem at such a temperature that the molecular structure of the elastomeric material comprising the ear piece cross-links to the molecular structure of the plastic material comprising the ear stem and temple, to integrally bond the ear piece to the ear stem. Therefore, the elastomeric ear piece of the present invention is prevented from detaching from the ear stem. Further, since the ear piece is integrally bonded to the ear stem, the ear piece does not move longitudinally on the temple, as may occur in the prior art. The elastomeric material comprising the ear piece is sufficiently deflectable to inhibit the ear piece from exerting excessive pressure on the head and ear of the wearer, while securely retaining the temple on the wearer. Thus, the ear piece provides substantial comfort to the wearer.

Additionally, in the preferred embodiment the ear piece comprises an open cell, hydrophilic elastomeric material has absorbs a small amount of moisture. This property of the material increases the coefficient of sliding friction when the material is wet, such as from perspiration for example, to further prevent the temple of the present invention from inadvertently sliding on the wearer's head.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein for providing an improved eyeglass temple that includes an integrally formed elastomeric ear piece on a production basis.

Figure 1:
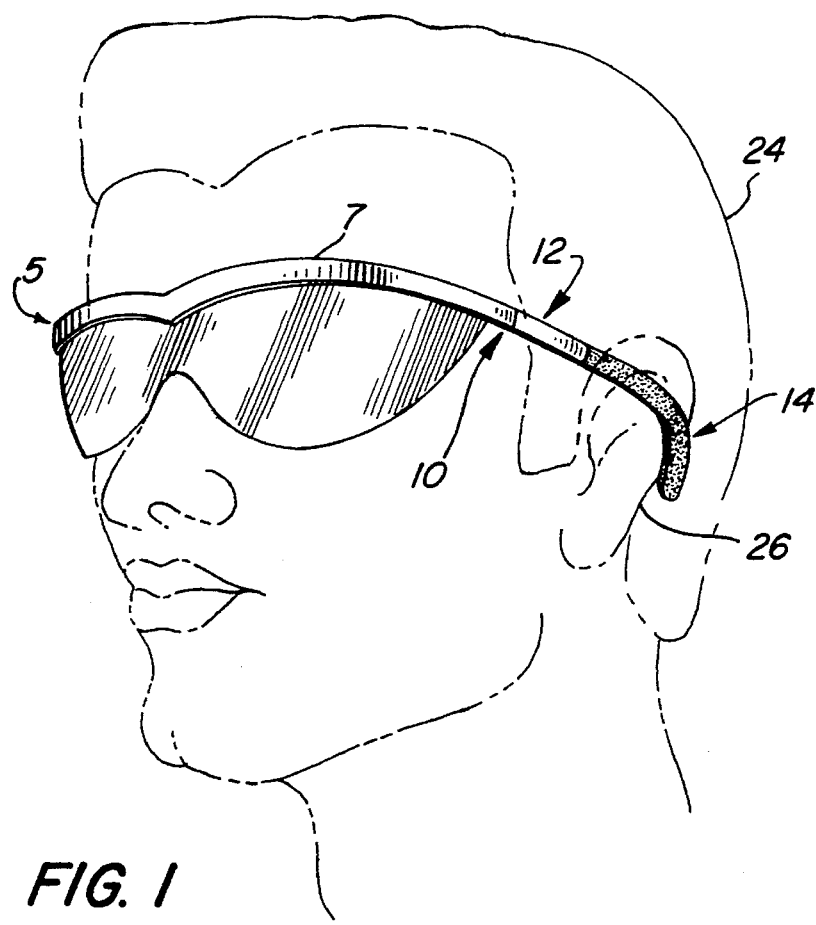
FIG. 1 is a perspective view of an eyeglass provided with a preferred embodiment of a temple embodying an integrally formed elastomeric ear piece of the present invention.
Figure 2:
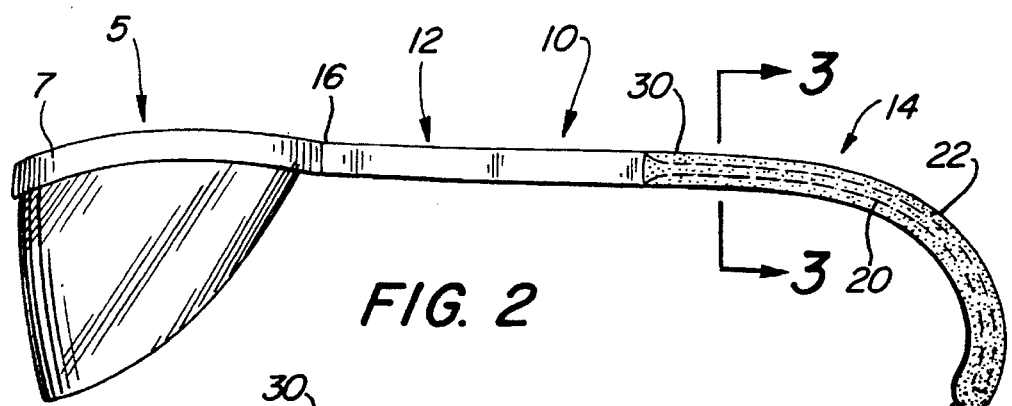
FIG. 2 is a side elevational view showing the preferred embodiment.

Referring now to FIG. 1 and FIG. 2 of the drawings, there is shown generally at 5, an eyeglass comprising a frame 7 and an improved eyeglass temple 10, constructed according to the principles of the present invention. The invented temple 10 is hingably coupled to the frame 7 using any one of several well known methods. The temple 10 comprises a support section, shown generally at 12, and an engaging portion, shown generally at 14. Preferably the temple 10 comprises a suitable substantially light, rigid material, such as a molded plastic, or other suitable materials, as are well known in the art.

The support section 12 extends from a proximal end 16 of the temple 10 to the engaging portion 14. The proximal end 16 is provided with means (not shown) for hingably coupling the temple 10 to the frame 7. The engaging portion 14 extends from an arcuate distal end 18 of the temple 10 to the support section 12. The engaging portion 14 is shown as being substantially arcuate, relative to the longitudinal axis of the temple 10, however the engaging portion 14 may be rectilinear, or other suitable alternative configurations.

Figure 3:
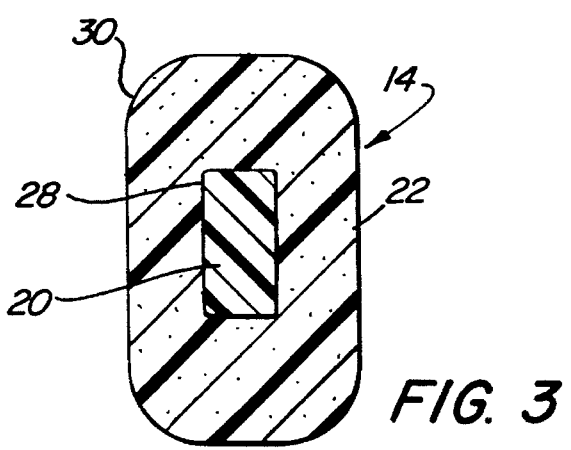
FIG. 3 is a cross-sectional view of an engaging portion of the invented temple taken along lines 3—3 of FIG. 2.

Referring now to FIG. 2 and FIG. 3 of the drawings, the engaging portion 14 comprises an ear stem 20 and an elastomeric ear piece 22 integrally formed on the ear stem 20. The ear stem 20 is integrally formed with the support section 12, and therefore comprises the same rigid plastic material. However, the ear stem 20 is configured so that it has a cross-sectional dimension less than the support section 12, while maintaining a cross-sectional configuration corresponding generally to the cross-sectional configuration of the support section 12. In the preferred embodiment, the cross-sectional configuration of the support section 12 and ear stem 20 are shown as generally rectangular. Preferably, the ear stem 20 has a cross-sectional dimension substantially one half of the cross-sectional dimension of the support section 12.

The elastomeric ear piece 22 comprises an appropriate resilient material, that is sufficiently deflectable to inhibit the ear piece 22 from exerting excessive pressure on a head 24 and ear 26 of a wearer (shown in FIG. 1), thus, the ear piece 22 provides substantial comfort to the wearer. Preferably, the ear piece 22 comprises an open-cell hydrophilic material. When the ear piece 22 is exposed to moisture such as perspiration, the hydrophilic material absorbs moisture to increase a coefficient of sliding friction between the wearer's head 24 and ear 26, and the engaging portion 14, to securely retain the temple 10 on the wearer. In the preferred embodiment, the ear piece 22 comprises KROTON G™, as manufactured by the Shell Oil Company, having a Durometric rating ranging from approximately 10 to approximately 75, as measured on the A scale. Thus, the ear piece 22 is sufficiently deflectable to inhibit the ear piece 22 from exerting excessive pressure on the head 24 and ear 26 of the wearer, while securely retaining the temple 10 on the wearer.

The ear piece 22 is integrally formed on an outer periphery 28 of the ear stem 20. In the preferred embodiment, the ear piece 22 extends proportionally outwardly from the outer periphery 28 of the ear stem 20, so that the ear piece 22 has an outer periphery 30 that is generally rectangular. However, the ear piece 22 may extend outwardly from the ear stem 20, so that the outer periphery 30 thereof is generally circular or ovular, for example. In the preferred embodiment, the outer periphery 30 of the ear piece 22 extends substantially flush with the support section 12, adjacent to the engaging portion 14. Further, the outer periphery 30 of the ear piece 22 may be provided with a grid configuration or a plurality of ribs (both not shown) for further increasing the coefficient of friction between the head 24 and ear 26, and the engaging portion 14.

The ear piece 22 is formed on the ear stem 20 at such a temperature that the molecular structure of the elastomeric material comprising the ear piece 22 cross-links to the molecular structure of the plastic material comprising the ear stem 20, so that the ear piece 22 is integrally bonded to the ear piece 22. Therefore, the ear piece 22 is prevented from inadvertently detaching from the ear stem 20 and temple 10. Further, the ear piece 22 is integrally bonded to the ear stem 20, so that unwanted axial movement of the ear piece 22 along the temple 10 does not occur.

The temple 10 of the preferred embodiment of the present invention is fabricated by, first providing a desired quantity of a molten plastic material that will comprise the temple 10 and a mold (not shown). Preferably, the mold is configured so that the cross-sectional dimension of the ear stem 20 is less than the cross-sectional dimension of the support section 12, as previously discussed. The molten plastic is then injected into the mold, using well known methods. The plastic material is then cooled to form the temple 10. The temple 10 is then placed in a second mold (also not shown). The second mold is designed to ensure that the ear piece 22 will have the desired shape.

A desired quantity of a molten elastomeric material, as previously discussed, is provided for the ear piece 22. The molten elastomeric material is injected into the second mold at such a temperature, that the molecular structure of the plastic material opens and permits the molecular structure of the elastomeric material to become integrated with the molecular structure of the plastic material. Thus, the molecular structures of the plastic and elastomeric materials "crosslink" to integrally bond the elastomeric material to the plastic material. The temple 10 is then cooled to form the engaging portion 14 where the ear piece 22 is integrally bonded to the ear stem 20.

Thus, there has been described an improved temple for retaining eyeglasses on the head of a wearer. The elastomeric ear piece provides an increased coefficient of friction between the engaging portion and the head and ear of the wearer for preventing inadvertent relative movement between the temple and the wearer, to aid with retaining the eyeglasses on the wearer. The elastomeric ear piece is cross-linked to the ear stem, to integrally bond the ear piece to the ear stem. Therefore, the elastomeric ear piece of the present invention does not detach from the ear stem, nor does the ear piece move about on the temple. The ear piece is sufficiently deflectable to inhibit the ear piece from exerting excessive pressure on the head and ear of the wearer, while securely retaining the temple on the wearer, to provide substantial comfort to the wearer.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. An improved eyeglass temple for retaining eyeglasses on the head of a wearer, comprising:

an elongated plastic temple having a first end, a second end, and an engaging portion extending from the second end of the temple towards the first end, the engaging portion for engaging the head of the wearer; and a resilient elastomeric member integrally formed on the engaging portion of the temple to provide a pliable ear piece, the pliable ear piece integrally formed on the engaging portion at such a temperature that the molecular structure of the elastomeric material comprising the ear piece cross-links to the molecular structure of the plastic comprising the temple to integrally bond the ear piece to the temple to prevent the ear piece from detaching from the engaging portion and for preventing the ear piece from moving about on the temple, the pliable ear piece extending along the engaging portion to provide an increased coefficient of friction between the temple and the head and ear of the wearer.

2. The eyeglass temple of claim 1 further comprising:

the temple having an ear stem extending from the second end towards the first end, and through the engaging portion, the ear stem having a cross-sectional dimension less than the cross-sectional dimension of the first end of the temple; and the ear piece having a cross-sectional configuration similar to the cross-sectional configuration of the ear stem and extending outwardly therefrom.

3. The eyeglass temple of claim 2 wherein the ear piece has an outer surface that extends substantially flush to the adjacent periphery of the first end of the temple.

4. The eyeglass temple of claim 1 wherein the ear piece comprises an open cell elastomeric material having a Durometric rating of at least 20 and not more than 70, as measured on the A scale.

5. The eyeglass temple of claim 4 wherein the open cell elastomeric material is hydrophilic for increasing a coefficient of sliding friction when the ear piece is exposed to moisture.

6. An improved eyeglass temple for increasing a coefficient of friction between the temple and the head and ear of a wearer, the temple comprising:

an elongated plastic temple having a first end and a second end, the temple comprising a temple section extending from the first end towards the second end and an engaging portion extending from the second end to the temple section, the engaging portion having an ear stem integrally formed with the temple section and extending from the temple section to the second end, the ear stem having a cross-sectional dimension less than the cross-sectional dimension of the temple section, the ear stem having an outer periphery; and a resilient, elastomeric ear piece integrally formed on the outer periphery of the ear stem to form the engaging portion, the elastomeric ear piece formed on the ear stem at such a temperature that the molecular structure of the elastomeric material comprising the ear piece cross-links to the molecular structure of the plastic material comprising the ear stem to integrally bond the ear piece to the ear stem, the ear piece bonded to the ear stem to prevent relative movement between the ear piece and the ear stem and to prevent the ear piece from detaching from the temple, the ear piece providing an increased coefficient of friction between the temple and the head and ear of the wearer.

7. The eyeglass temple of claim 6 wherein the elastomeric ear piece comprises an open cell elastomeric material having a Durometric rating of at least 10 and not more than 75, as measured on the A scale.

8. The eyeglass temple of claim 7 wherein the open cell elastomeric material is hydrophilic for increasing a coefficient of sliding friction when the ear piece is exposed to moisture.

9. The eyeglass temple of claim 6 wherein the ear piece extends proportionally outwardly from the ear stem, such that the ear piece has an outer periphery configured similar to the configuration of the outer periphery of the ear stem.

10. The eyeglass temple of claim 6 wherein the cross-sectional dimension of the ear piece combined with the cross-sectional dimension of the ear stem is substantially equal to the cross-sectional dimension of the temple section adjacent the engaging portion.

11. An improved eyeglass temple for retaining eyeglasses on the head of a wearer, the temple comprising:

an elongated rigid plastic temple comprising a support section and an engaging portion;

the support section extending from a first end of the temple towards a second end, the first end provided for coupling the temple to a frame of the eyeglasses;

the engaging portion extending from the second end of the temple to the support section, the engaging portion having an ear stem integrally formed with the support section and extending from the second end to the support section, the ear stem having a cross-sectional dimension substantially one half of the cross-sectional dimension of the support section, the ear stem having an outer periphery; and a resilient, elastomeric ear piece integrally formed on the outer periphery of the ear stem for forming the engaging portion, the elastomeric ear piece providing an increased coefficient of friction between the temple and the head and ear of the wearer to prevent inadvertent relative movement between the temple and the wearer, the elastomeric ear piece formed on the ear stem at such a temperature that the molecular structure of the elastomeric material comprising the ear piece cross-links to the molecular structure of the plastic material comprising the temple to integrally bond the ear piece to the ear stem, the ear piece bonded to the ear stem for preventing the ear piece from detaching from the ear stem and to prevent the ear piece from moving relative to the ear stem, the ear piece being sufficiently deflectable to inhibit the ear piece from exerting excessive pressure on the head and ear of the wearer, while securely retaining the temple on the wearer.

12. The eyeglass temple of claim 11 wherein the ear piece comprises an open cell elastomeric, hydrophilic material for increasing a coefficient of sliding friction when the ear piece is exposed to moisture, the elastomeric material having a Durometric rating of at least 20 and not more than 70, as measured on the A scale.

13. The eyeglass temple of claim 11 wherein the ear piece extends proportionally outwardly from the ear stem, such that the ear piece has an outer periphery configured similar to the configuration of the outer periphery of the ear stem.

14. The eyeglass temple of claim 11 wherein the cross-sectional dimension of the ear piece combined with the cross-sectional dimension of the ear stem is substantially equal to the cross-sectional dimension of the support section adjacent to the engaging portion.

15. The eyeglass temple of claim 11 wherein the cross-sectional dimension of the engaging portion is less than cross-sectional dimension of the support section adjacent to the engaging portion.

16. The eyeglass temple of claim 11 wherein the cross-sectional dimension of the engaging portion is greater than the cross-sectional dimension of the support section adjacent to the engaging portion.

* * * * *